(12) United States Patent
Sung

(10) Patent No.: US 10,648,845 B2
(45) Date of Patent: May 12, 2020

(54) DISPLAY DEVICE OF VEHICLE

(71) Applicants: HYUNDAI MOTOR COMPANY, Seoul (KR); KIA MOTORS CORPORATION, Seoul (KR)

(72) Inventor: Tae Hyun Sung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/155,073

(22) Filed: Oct. 9, 2018

(65) Prior Publication Data
US 2019/0128725 A1 May 2, 2019

(30) Foreign Application Priority Data
Oct. 30, 2017 (KR) ........................ 10-2017-0142523

(51) Int. Cl.
*G08B 19/00* (2006.01)
*G01F 23/00* (2006.01)
*B60K 37/00* (2006.01)
*G01F 23/36* (2006.01)
*G01F 23/20* (2006.01)
*B60K 35/00* (2006.01)
*B60K 37/02* (2006.01)

(52) U.S. Cl.
CPC .......... *G01F 23/0076* (2013.01); *B60K 35/00* (2013.01); *B60K 37/00* (2013.01); *B60K 37/02* (2013.01); *G01F 23/20* (2013.01); *G01F 23/36* (2013.01); *B60K 2370/168* (2019.05); *B60K 2370/174* (2019.05)

(58) Field of Classification Search
CPC ...... G01F 23/0076; G01F 23/02; G01F 23/36; B60K 37/00
See application file for complete search history.

(56) References Cited

U.S. PATENT DOCUMENTS

| | | | | |
|---|---|---|---|---|
| 6,812,942 B2* | 11/2004 | Ribak | .................... | B60K 35/00 345/30 |
| 2007/0052875 A1* | 3/2007 | Suzuki | .................... | B60K 37/02 349/1 |
| 2010/0191404 A1* | 7/2010 | Ishikawa | ................ | B60K 35/00 701/31.4 |
| 2014/0002256 A1* | 1/2014 | Hoshiba | .................. | B60K 6/445 340/441 |
| 2014/0111540 A1* | 4/2014 | Morimoto | .............. | B60K 35/00 345/619 |
| 2016/0125666 A1* | 5/2016 | Izumikawa | ............. | E02F 9/261 60/301 |
| 2017/0205881 A1* | 7/2017 | Yamashita | ............ | G06F 3/0488 |
| 2018/0079306 A1* | 3/2018 | Kim | ....................... | B60K 37/02 |

* cited by examiner

*Primary Examiner* — Phung Nguyen
(74) *Attorney, Agent, or Firm* — Morgan, Lewis & Bockius LLP

(57) ABSTRACT

A display device includes: a first display area displaying first characteristics digitally, a second display area displaying each of second characteristics as a scalar value, and a third display area displaying each of third characteristics as a rotational angle, and the first to third characteristics are displayed on a same display.

18 Claims, 4 Drawing Sheets

DISPLAY DEVICE OF VEHICLE

CROSS REFERENCE TO RELATED APPLICATION

This application claims priority under 35 U.S.C. § 119 to Korea Application No. 10-2017-0142523 filed in Korea on Oct. 30, 2017 which is hereby incorporated in its entirety by reference as if fully set forth herein.

TECHNICAL FIELD

The present disclosure relates to a display device of vehicle, and a speed display part, an RPM display part or a fuel quantity display part displayed on a cluster of a vehicle.

BACKGROUND

In general, in order to drive a vehicle in an optimum state or to easily detect situations of the vehicle during driving for the purpose of safe driving, various indicators/display parts are mounted in an instrument panel or a cluster provided in front of a driver's seat of the vehicle.

The cluster includes a revolutions per minute (RPM) display part to display RPM of an engine, a fuel efficiency display part, a speed display part to display a speed of the vehicle, an accumulated distance display part to display a total driving distance of the vehicle, a fuel quantity display part to display a residual fuel quantity, etc.

A cluster controller is installed in the cluster and thus displays the RPM of the engine, the speed and accumulated distance of the vehicle, etc., using data transmitted from an engine control unit (ECU) or a powertrain control unit (PCU).

However, the conventional cluster of the vehicle has problems, as follow.

The conventional cluster simply displays the accumulated distance but it is difficult for a driver to know fuel consumptions according to driving of the vehicle and associated fuel costs. Due to such a situation, particularly, during long-distance driving or whenever it is necessary to calculate fuel consumption each month, the fuel consumption should be calculated and a fuel cost per liter should be confirmed, thus causing inconvenience. Such a process causes a difficulty in accurately calculating the fuel consumption, and thus, an inaccurate fuel cost may be calculated.

Further, RPM being closely related to fuel efficiency of the vehicle is displayed separately from the fuel efficiency, and thus, it may be difficult for the driver to detect both the RPM and the fuel efficiency of the vehicle during driving at a high speed.

Further, since only a residual fuel quantity is displayed, it is difficult to determine whether or not the vehicle can reach a destination using the residual fuel quantity, and if the vehicle cannot reach the destination using the residual fuel quantity, to determine how much fuel is additionally required to refuel the vehicle.

Moreover, if the driver desires to reach a specific point, it is difficult to detect a fuel quantity necessary to reach the corresponding point, a cost required to charge the vehicle with the fuel quantity, an expected charging time and expected average fuel efficiency.

SUMMARY

The present disclosure is directed to a display device of a vehicle that substantially obviates one or more problems due to limitations and disadvantages of the related art.

An object of embodiments is to provide a display device of a vehicle through which a driver may detect fuel consumption according to driving of the vehicle, particularly, during long-distance driving, and an associated fuel cost.

Another object of the embodiments is to provide a display device of a vehicle through which a driver may detect both RPM and fuel efficiency during driving at a high speed.

Another object of the embodiments is to provide a display device of a vehicle through which a driver may easily determine whether or not the vehicle can reach a destination sing a residual fuel quantity, and if the vehicle cannot reach the destination using the residual fuel quantity, determine how much fuel is additionally required to refuel the vehicle.

Another object of the embodiments is to provide a display device of a vehicle through which, if a driver desires to reach a specific point, the driver may easily detect a fuel quantity necessary to reach the corresponding point, a cost required to charge the vehicle with the fuel quantity, an expected charging time and expected average fuel efficiency.

Yet another object of the embodiments is to provide a display device of a vehicle which, even if a target destination point of a driver is not set, may display a current fuel quantity, a full fuel quantity, some charging fuel quantities and expected charging costs according to charging of the vehicle with the respective fuel quantities so that the driver can easily perform selection.

In one embodiment of the present disclosure, a display device of a vehicle includes a first display area displaying first characteristics digitally, a second display area displaying each of second characteristics as a scalar value, and a third display area displaying each of third characteristics as a rotational angle, wherein the first to third characteristics are displayed on a same display.

Each of the first to third characteristics may be any one of average fuel efficiency, instantaneous fuel efficiency and revolutions per minute (RPM) of the vehicle such that the first to third characteristics are different from one another.

The first characteristics may be the average fuel efficiency of the vehicle, and the first display area may be provided in a central region of the display unit.

The second characteristics may be the instantaneous fuel efficiency of the vehicle, and the second display area may display the second characteristics of the vehicle as the scalar value in a direction towards an edge region of the display unit from a region adjacent to the first display area.

The second display area may be displayed in a first color, and the scalar value may be displayed in a second color different from the first color.

The third characteristics may be the revolutions per minute (RPM) of the vehicle, and the third display area may be a scale provided on a circumference of the display unit, spaced apart from the central region of the display unit by a designated distance and disposed within a designated angle about the central region of the display unit.

The second display area may include a rotator, one end of the rotator being provided in the central region of the display unit and the other end of the rotator being provided adjacent to the scale so that the other end of the rotator indicates the RPM of the vehicle according to rotation of the rotator.

Each of the first to third characteristics may be any one of average fuel efficiency, instantaneous fuel efficiency and an instantaneous speed of the vehicle such that the first to third characteristics are different from one another.

The third characteristics may be the instantaneous speed of the vehicle, and the third display area may be a scale provided on a circumference of the display unit, spaced apart from the central region of the display unit by a designated distance and disposed within a designated angle about the central region of the display unit.

The second display area may include a rotator, one end of the rotator being provided in the central region of the display unit and the other end of the rotator being provided adjacent to the scale so that the other end of the rotator indicates the instantaneous speed of the vehicle according to rotation of the rotator.

In another embodiment of the present disclosure, a display device of a vehicle includes a fourth display area displaying a residual fuel quantity, a fifth display area displaying an available driving distance according to the residual fuel quantity, and a sixth display area displaying a predetermined arrival point so as to overlap the fifth display area, wherein the fourth to sixth display areas are displayed on the same display.

The fifth display area may further display a total available driving distance of the vehicle according to the residual fuel quantity after the vehicle reaches the arrival point.

The fifth display area may display the available driving distance and the total available driving distance in different colors.

The fifth display area may display the available driving distance and the total available driving distance as scalar values, and the display device may further include a seventh display area configured to display the available driving distance and the total available driving distance as digital values.

The fourth display area may further display at least one of a first fuel cost taken to fully refuel the vehicle or a second fuel cost taken to reach the predetermined arrival point, and the first and second fuel costs may be set based on oil price information of a nearest gas station to the vehicle.

The fourth display area may further display at least one of a first expected charging time taken to fully refuel the vehicle or a second expected charging time according to a current fuel quantity, and the first and second expected charging times may be set based on standard fuel efficiency and a regulation speed of the vehicle.

In yet another embodiment of the present disclosure, a display device of a vehicle includes an eleventh display area displaying a full fuel quantity, a current fuel quantity and at least one charging fuel quantity, a twelfth display area displaying fuel costs according to the respective fuel quantities displayed by the first display area, and a thirteenth display area displaying available driving distances of the vehicle according to the respective fuel quantities displayed by the eleventh display area.

The display device may further include at least one of a fourteenth display area displaying expected charging times according to the respective fuel quantities displayed by the eleventh display area, or a fifteenth display area displaying change in the fuel efficiency of the vehicle according to change in the fuel quantity, the expected charging times may be set from expected charging times provided by the vehicle and expected charging times provided by a charger, and change in a weight of the vehicle according to the change in the fuel quantity may be reflected in the change in the fuel efficiency.

The eleventh display area may include a touch panel, and when a passenger touches a specific fuel quantity in the eleventh display area, the twelfth display area may display a fuel cost according to the specific fuel quantity, the thirteenth display area may display an available driving distance according to the specific fuel quantity, and the fourteenth display area may display an expected charging time according to the specific fuel quantity.

The display device may further include a sixteenth display area configured to display payment amounts according to the respective fuel quantities.

BRIEF DESCRIPTION OF THE DRAWINGS

Arrangements and embodiments may be described in detail with reference the following drawings in which like reference numerals refer to like elements and wherein.

DETAILED DESCRIPTION

Hereinafter, methods and vehicle control units in accordance with embodiments will be described in more detail with reference to the accompanying drawings. Terms used in the following description are used simply to describe specific examples and are not limited thereby.

Further, in the following description of the embodiments and the claims, it will be understood that a singular expression may include a plural expression, unless stated otherwise, and terms "and/or" may include arbitrary and all possible combinations of one or more of related listed items.

A display device 1000 in accordance with one embodiment may be displayed on a cluster of a vehicle, without being limited thereto, for example, be displayed on a navigation system or on another display device of a vehicle not provided with a navigation system, and be used in transportation means which move at a speed using fuel, in addition to vehicles, for example, an airplane. This is applicable also to other embodiments which will be described later.

The display device 1000 in accordance with the embodiment may include a first display area 1100 displaying first characteristics, a second display area 1200 displaying second characteristics, and a third display area 1300 displaying third characteristics.

The first to third characteristics may be different characteristics related to vehicles, particularly, driving of the vehicles, and for example, each of the first to third characteristics may be any one of average fuel efficiency, instantaneous fuel efficiency and revolutions per minute (RPM) of the vehicle such that the first to third characteristics are different from one another.

Further, the first to third display areas 1100 to 1300 may display the first to third characteristics by different methods, and for example, display the corresponding characteristics digitally and as a scalar value and a rotational angle, respectively.

Further, the first to third display areas 1100 to 1300 may be displayed in one display unit. Here, one display unit may be, for example, one integral region displayed in the cluster of the vehicle.

Figure 1:
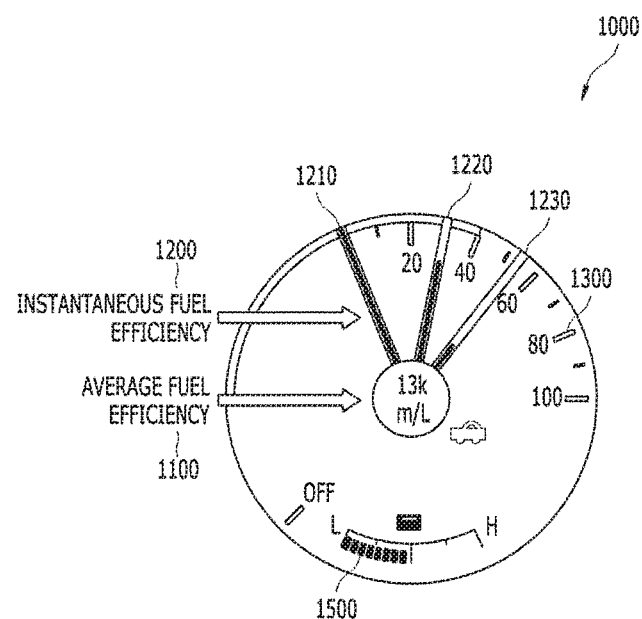
FIG. 1 is a view illustrating a display device of a vehicle in accordance with one embodiment.

In the embodiment shown in FIG. 1, the first display area 1100 displays the first characteristics of the vehicle digitally, and the first characteristics may be, for example, average fuel efficiency of the vehicle. The second display area 1200 displays the second characteristics of the vehicle as a scalar value, and the second characteristics may be, for example, instantaneous fuel efficiency of the vehicle. The third display area 1300 displays the third characteristics of the vehicle as a rotational angle, and the third characteristics may be, for example, revolutions per minute (RPM).

The first display area 1100 may be provided in a central region of one display unit. Further, the first display area 1100 displays average fuel efficiency of the vehicle digitally. The average fuel efficiency may be, for example, average fuel efficiency of the vehicle after an engine of the vehicle is started.

A residual fuel quantity of the vehicle may be displayed by a fourth display, area 1500 provided in a lower region of the display device 100 of FIG. 1. Here, fuel may include electricity and hydrogen charging the vehicle, in addition to fossil fuel, such as gasoline, and this is applicable also to embodiments, which will be described later.

The third display area 1300 may include a scale disposed along a circumference of the display unit, spaced apart from the first display area 1100 by a designated distance, within a designated angle about the central region of the display unit, i.e., the first display area 1100.

In FIG. 1, the third display area 1300 displays RPM of the vehicle, and when a needle-shaped rotator forming the second display area 1200 is rotated, one end of the rotator may be fixed to the central region of the display unit, i.e., the first display area 1100, and the other end of the rotator pointing to the above-described scale may be rotated and thus indicate the RPM of the vehicle.

The second display area 1200 may be the above-described needle-shaped rotator, and have a flat surface similar to a long rectangle having a designated width. Further, as exemplarily shown in FIG. 1, the second display area 1200 may be disposed in a direction towards the third display area 1300 disposed at the edge region of the display unit from a region adjacent to the first display area 1100.

The second display area 1200 may be displayed in a first color, and the instantaneous fuel efficiency of the vehicle displayed as the above-described scalar value may be displayed in a second color different from the first color. The first color and the second color nay be colors which are easily distinguished from each other, and for example, be complementary colors.

The border of the second display area 1200 may be displayed as the first color, and the center of the second display area 1200 may have a linear shape displayed as the second color and the second color may be implemented by light emitting devices, for example, light emitting diodes.

When the instantaneous fuel efficiency of the vehicle is zero, the line of the second color may not be displayed, and when the instantaneous fuel efficiency of the vehicle reaches the maximum value, the line of the second color may be displayed as having the greatest length.

Further, since the second display area 1200 displays the instantaneous fuel efficiency of the vehicle through the length of line of the second color and displays the RPM of the vehicle through the rotational angle of the rotator, the color change and rotational angle of the second display area 1200 may be displayed as a vector value indicating both the instantaneous fuel efficiency and the RPM of the vehicle.

FIG. 1 exemplarily illustrates three examples of the second display area 1200 having different positions and shapes. A first exemplary second display area 1210 may display instantaneous fuel efficiency reaching the maximum value and RPM of zero, a second exemplary second display area 1220 may display instantaneous fuel efficiency being lower than the maximum value and RPM of 30 (×1000), and a third exemplary second display area 1230 may display the lowest instantaneous fuel efficiency and RPM of 55 (×1000).

The display device of the vehicle in accordance with this embodiment simultaneously displays RPM, instantaneous fuel efficiency and average fuel efficiency of the vehicle within one display unit, and particularly, displays three different characteristics of the vehicle through different methods so that a driver may simply check the characteristics.

Figure 2:
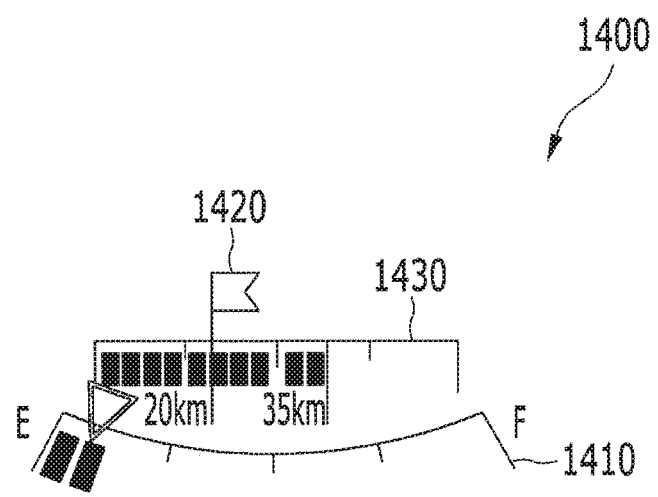
FIGS. 2 to 4 are views illustrating display devices of a vehicle in accordance with another embodiment.
Figure 3:
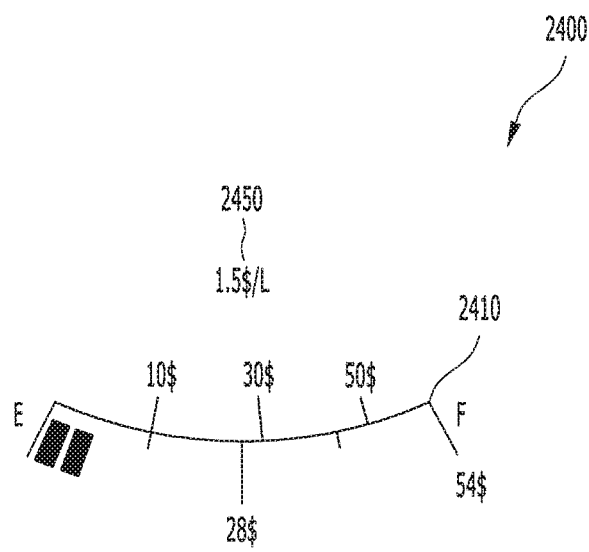
Figure 4:
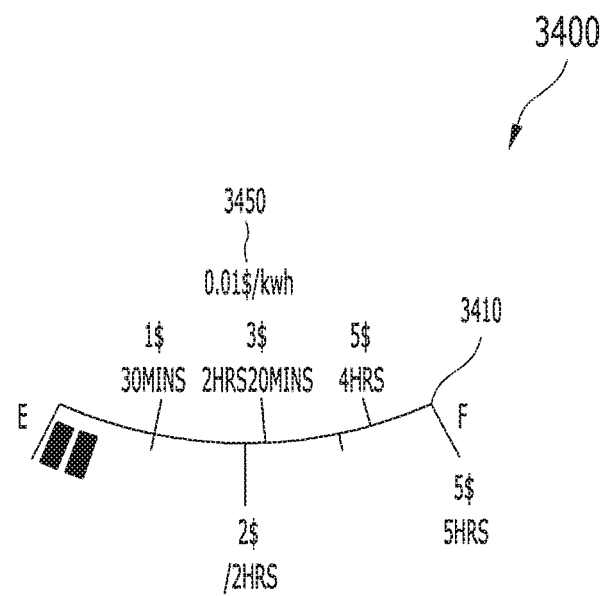

FIGS. 2 to 4 are views illustrating display devices of a vehicle in accordance with another embodiment.

A display device 1400 of a vehicle shown in FIG. 2 may include a fourth display area 1410 displaying a residual fuel quantity, a fifth display area 1420 displaying an available driving distance according to the residual fuel quantity, and a sixth display area 1430 displaying a predetermined arrival point.

In the fourth display area 1410, the residual fuel quantity may be displayed as a scalar quantity between 'F' meaning that the vehicle is full of fuel and 'E' meaning that the vehicle is empty. The sixth display area 1430 may be displayed so as to overlap the fifth display area 1420.

The fifth display area 1420 may display the available driving distance according to the residual fuel quantity through two methods, i.e., digitally and as a scalar value, as exemplarily shown in the figure. Further, in the sixth display area 1430, the predetermined arrival point is displayed as a flag, and particularly, if the available driving distance according to the residual fuel quantity, displayed by the fifth display area 1420, and the arrival point are displayed so as to overlap each other, a driver may easily grasp the available driving distance according to the residual fuel quantity and the predetermined arrival point.

Here, the available driving distance according to the residual fuel quantity may be calculated according to official fuel efficiency or driving average fuel efficiency of the vehicle and a current fuel quantity, and the arrival point may be a place which the driver sets as a destination through a navigation system, etc. Here, the driving average fuel efficiency may be average fuel efficiency of the corresponding vehicle which is calculated according to driving.

In FIG. 2, 20 km and 35 km may be displayed at both sides of the flag displaying the arrival point in the sixth display area 1430, and such a region may be referred to as a seventh display area. Here, 20 km means a distance to the arrival point, and 35 km means an additional distance of the vehicle according to the residual fuel quantity after the vehicle reaches the arrival point. Here, 20 km may be referred to as the available driving distance, and 35 km may be referred to as a total available driving distance which means a distance to empty (DTE).

The fifth display area 1420 may display the available driving distance and the total available driving distance as scalar values of a graph type, and the available driving distance and the total available driving distance may be displayed in different colors so that the driver may easily grasp the same.

A display device 2400 of a vehicle shown in FIG. 3 may include a fourth display area 2410 displaying a residual fuel quantity, and the fourth display area 2410 may display first and second fuel costs, in addition to the residual fuel quantity. The first fuel cost is a fuel cost required to fully refuel the vehicle, and for example, may be $54 in FIG. 3. The second fuel cost is a fuel cost required to reach a predetermined arrival point. The first and second fuel costs may be set based on oil price information of the nearest gas station to a current position of the vehicle according to driving information from a navigation system, or be set based on national average oil price information.

Further, in addition to the first fuel cost, costs required to respectively refuel the vehicle up to respective gradations of a scale of the fourth display area 2410 may be displayed. The first and second fuel costs may be displayed through a digital method.

Here, oil price is displayed in a first region 2450 above the fourth display area 2410, and the oil price may be set based on oil price information of the nearest gas station to the current position of the vehicle according to driving information from the navigation system, or be set based on national average oil price information, as described above. Further, a name of the corresponding gas station coinciding with the oil price information may be displayed in the first region 2450.

A display device 3400 of a vehicle shown in FIG. 4 may include a fourth display area 3410 displaying a residual fuel quantity, and the fourth display area 3410 may display first and second charging costs, in addition to the residual fuel quantity. The first charging cost is a charging cost taken to fully charge the vehicle, and for example, may be $54 in FIG. 3. The second charging costs may be charging costs to respectively charge the vehicle up to respective gradations of a scale of the fourth display area 3410. Further, together with the first and second charging costs, an available driving time of the vehicle after corresponding charging may be displayed.

Electricity price is displayed in a first region 3450 above the fourth display area 3410, and the electricity price may be set based on electricity price information of the nearest charging station to a current position of the vehicle according to driving information from a navigation system, or be set based on national average electricity price information.

Further, time may be displayed under the first and second charging costs displayed in the fourth display area 3410. A first available driving time displayed under the first charging cost is an available driving time of the vehicle without additional charging after full-charging F of the vehicle, and a second available driving time displayed under the second charging cost is an available driving time of the vehicle without additional charging after charging of the vehicle according to the second charging cost.

Here, the first and second available driving times may be calculated based on standard fuel efficiency and a regulation speed of the vehicle. Further, the first and second available driving times may be calculated based on average fuel efficiency in consideration of driver's driving habits, instead of the standard fuel efficiency of the vehicle.

Figure 5:
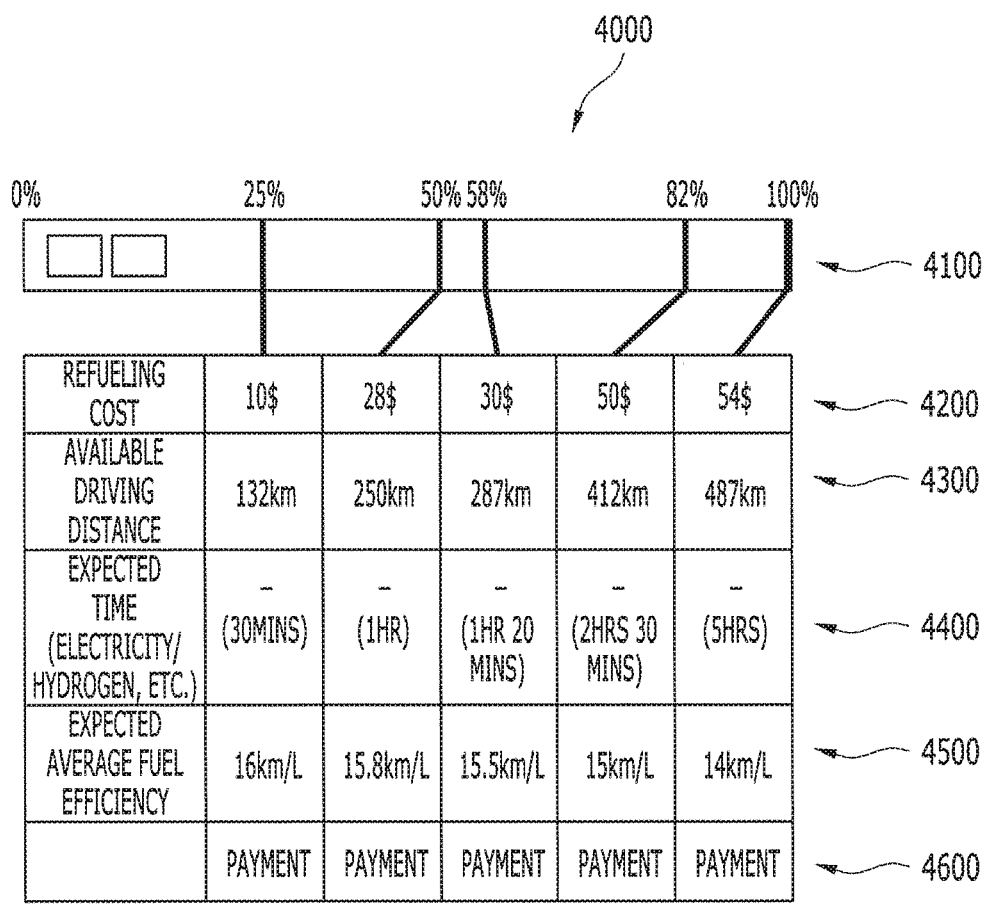
FIGS. 5 and 6 are views illustrating a display device of a vehicle in accordance with yet another embodiment.
Figure 6:
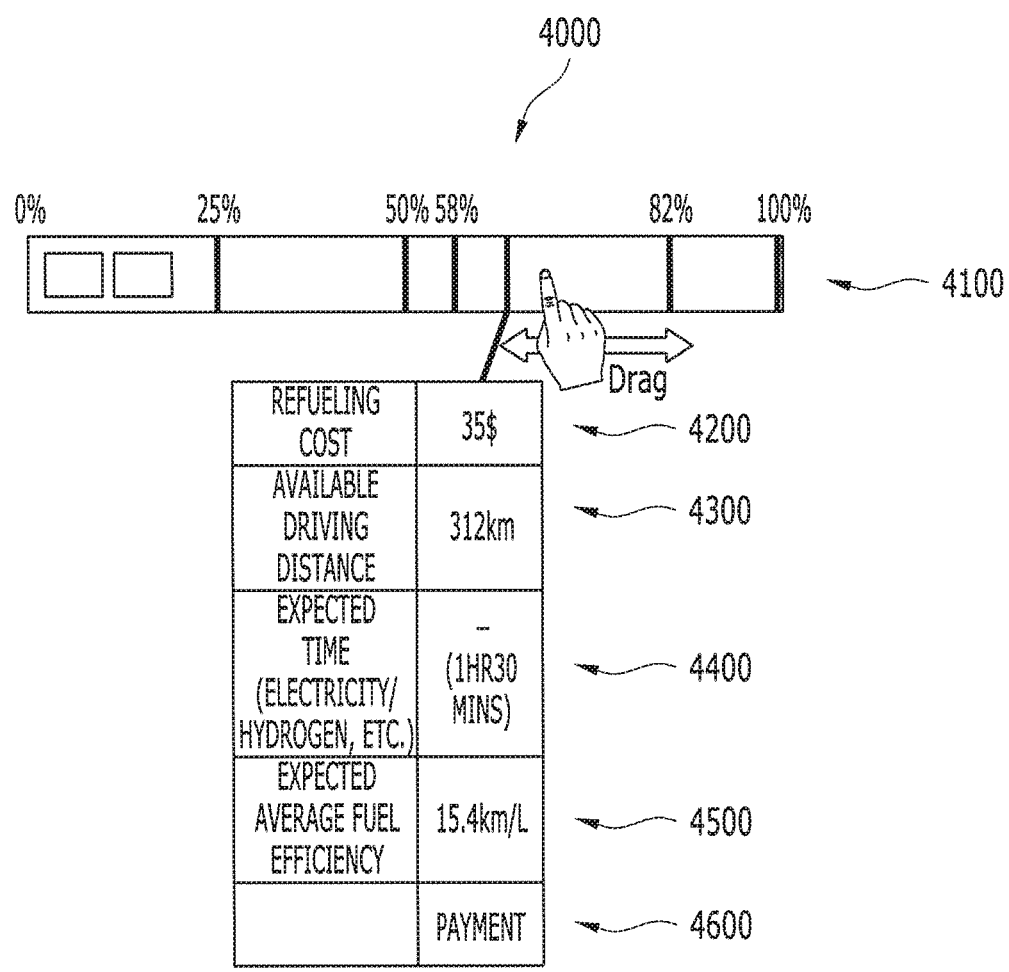

FIGS. 5 and 6 are views illustrating a display device of a vehicle in accordance with yet another embodiment.

A display device 4000 of a vehicle of FIG. 5 may include eleventh to sixteenth display areas 4100 to 4600.

The eleventh display area 4100 may display a full fuel quantity, a current fuel quantity and at least one specific fuel quantity, for example, 50%, 58%, 83%, etc., as digital values at an upper region thereof and as scalar values at a lower region thereof. Here, a fuel quantity of 50% represents charging of the vehicle with fuel by 50% of the full fuel quantity.

The twelfth display area 4200 displays fuel costs with respect to the respective fuel quantities displayed by the first display area 4100. That is, the twelfth display area 4200 displays respective fuel costs at the fuel quantities of 25%, 50%, 58%, 82% and 100% of the eleventh display area 4100. Here, the fuel costs may be calculated or set based on oil price information of the nearest gas station to a current position of the vehicle.

The thirteenth display area 4300 displays available driving distances of the vehicle according to the respective fuel quantities displayed by the eleventh display area 4100, and displays available driving distances of the vehicle after refueling or charging the vehicle with fuel at the fuel costs displayed by the twelfth display area 4200.

The fourteenth display area 4400 displays expected charging times according to the respective fuel quantities displayed by the eleventh display area 4100, and displays available driving times of the vehicle after refueling or charging the vehicle with fuel at the fuel costs displayed by the twelfth display area 4200. Here, the available driving times may be set based on standard fuel efficiency of the vehicle or average fuel efficiency of the vehicle in consideration of driver's driving habits, and a regulation speed of the vehicle. Further, the expected charging times may be set from expected charging times provided by the vehicle and expected charging time provided by a charger.

The fifteenth display area 4500 may display change in fuel efficiency of the vehicle according to change in the fuel quantity, and the fact that, even in the same vehicle, a weight of the vehicle is changed according to change in a fuel quantity and thus fuel efficiency may be changed is reflected.

For example, in this embodiment, the eleventh display area 4100 may include a touch panel. Here, when a passenger of the vehicle, such as a driver, touches a specific fuel quantity between the full fuel quantity and the current fuel quantity in the eleventh display area 4100, the twelfth to fifteenth display areas 4200 to 2500 are moved thereby. For example, when the driver touches or drags the fuel quantity of 82% in the eleventh display area 4100, the twelfth display area 4200 may display $50 as the fuel cost, the thirteenth display area 4300 may display 412 km as the available driving distance, the fourteenth display area 4400 may display 2 hours 30 minutes as the expected charging time, and the fifteenth display area 4500 may display 15 km/L as the expected average fuel efficiency.

Further, the sixteenth display area 4600 may display payment windows according to the respective fuel quantities (refueling costs), and in the above-described example, the driver may touch a cost corresponding to $50 of the twelfth display area 4200. If the display device 4000, particularly, the sixteenth display area 4600, is provided in a navigation system, a refueling quantity may be determined and a fueling cost may be paid through wireless communication.

In this embodiment, a plurality of refueling costs (charging costs) may be displayed, and thus, a plurality of available driving distances, expected charging times and expected average fuel efficiencies according to the respective refueling costs may be displayed, thereby providing various refueling quantities (refueling costs) to the driver. Further, when the refueling costs are displayed, monetary units, such as $10 and $50, may be proposed so as not to require any small change.

In the display device of the vehicle in accordance with this embodiment, when a driver or a passenger determines a designated fuel quantity on a cluster or a navigation system through a designated method, such as touch, the driver may simultaneously confirm a fuel cost, an available driving distance, an available driving time and expected average fuel efficiency, according to the determined fuel quantity.

As is apparent from the above description, a display device of a vehicle in accordance with the embodiments may simultaneously display RPM, instantaneous fuel efficiency and average fuel efficiency of the vehicle within one display unit, and particularly, display different characteristics through different methods, so that a driver may simply confirm the characteristics.

Further, in the display device of the vehicle, when the driver or a passenger determines a designated fuel quantity on a cluster or a navigation system through a designated method, such as touch, the driver may simultaneously confirm a fuel cost, an available driving distance, an available driving time and expected average fuel efficiency according to the determined fuel quantity.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A display device of a vehicle comprising:
    a first display area displaying first characteristics digitally;
    a second display area displaying each of second characteristics as a scalar value; and
    a third display area displaying each of third characteristics as a rotational angle,
    wherein the first to third characteristics are displayed on a same display,
    wherein each of the first to third characteristics is any one of average fuel efficiency, instantaneous fuel efficiency, and Revolutions Per Minute (RPM) of the vehicle such that the first to third characteristics are different from one another, and
    wherein the first characteristics are the average fuel efficiency of the vehicle, and the first display area is a central region of the display.

2. The display device of claim 1, wherein the second characteristics include the instantaneous fuel efficiency of the vehicle, and the second display area displays each of the second characteristics of the vehicle as the scalar value in a direction towards an edge region of the display from a region adjacent to the first display area.

3. The display device of claim 2, wherein the second display area is displayed in a first color, and the scalar value is displayed in a second color different from the first color.

4. The display device of claim 1, wherein the third characteristics are the RPM of the vehicle, and the third display area is a scale arranged on a circumference of the display, spaced apart from the central region of the display by a designated distance and disposed within a designated angle about the central region of the display.

5. The display device of claim 4, wherein the second display area comprises a rotator, a first end of the rotator disposed in the central region of the display and a second end of the rotator disposed adjacent to the scale so that the second end of the rotator indicates the RPM of the vehicle according to rotation of the rotator.

6. The display device of claim 1, wherein each of the first to third characteristics is any one of the average fuel efficiency, the instantaneous fuel efficiency, and an instantaneous speed of the vehicle such that the first to third characteristics are different from one another.

7. The display device of claim 6, wherein the third characteristics include the instantaneous speed of the vehicle, and the third display area is a scale displayed on a circumference of the display and spaced apart from the central region of the display by a designated distance within a designated angle about the central region of the display.

8. The display device of claim 7, wherein the second display area comprises a rotator, a first end of the rotator disposed in the central region of the display and a second end of the rotator disposed adjacent to the scale so that the second end of the rotator indicates the instantaneous speed of the vehicle according to rotation of the rotator.

9. A display device of a vehicle comprising:
    a first display area displaying a residual fuel quantity;
    a second display area displaying an available driving distance according to the residual fuel quantity; and
    a third display area displaying a predetermined arrival point to overlap the second display area,
    wherein the first to third display areas are displayed on a same display.

10. The display device of claim 9, wherein the second display area further displays a total available driving distance of the vehicle according to the residual fuel quantity after the vehicle reaches the arrival point.

11. The display device of claim 10, wherein the second display area displays the available driving distance and the total available driving distance in different color.

12. The display device of claim 10, wherein the second display area displays the available driving distance and the total available driving distance as scalar values, and
    wherein the display device further comprises a fourth display area displaying the available driving distance and the total available driving distance as digital values.

13. The display device of claim 9, wherein the first display area further displays at least one of a first fuel cost taken to fully refuel the vehicle or a second fuel cost taken to reach the predetermined arrival point, and
    wherein the first and second fuel costs are set based on oil price information of a nearest gas station to the vehicle.

14. The display device of claim 9, wherein the first display area further displays at least one of a first expected charging time taken to fully refuel the vehicle or a second expected charging time according to a current fuel quantity, and
    wherein the first and second expected charging times are set based on standard fuel efficiency and a regulation speed of the vehicle.

15. A display device of a vehicle comprising:
    a first display area displaying a full fuel quantity, a current fuel quantity, and at least one charging fuel quantity;
    a second display area displaying fuel costs according to the respective fuel quantities displayed by the first display area; and
    a third display area displaying available driving distances of the vehicle according to the respective fuel quantities displayed by the first display area.

16. The display device of claim 15, further comprising at least one of:
    a fourth display area displaying expected charging times according to the respective fuel quantities displayed by the first display area; or
    a fifth display area displaying change in the fuel efficiency of the vehicle according to change in the fuel quantity,
    wherein the expected charging times are set from expected charging times of the vehicle and expected charging times of a charger, and
    wherein the change in the fuel efficiency varies as a weight of the vehicle, which varies by the change in the fuel quantity, varies.

17. The display device of claim 15, wherein the first display area comprises a touch panel, and
    when a passenger touches a specific fuel quantity in the first display area, the second display area displays a fuel cost according to the specific fuel quantity, the third display area displays an available driving distance according to the specific fuel quantity, and a fourth display area displays an expected charging time according to the specific fuel quantity.

18. The display device of claim 15, further comprising a fourth display area configured to display payment amounts according to the respective fuel quantities.

* * * * *